(12) United States Patent
Wakabayashi et al.

(10) Patent No.: US 11,492,047 B2
(45) Date of Patent: Nov. 8, 2022

(54) VEHICLE-BODY STRUCTURE OF VEHICLE

(71) Applicant: MAZDA MOTOR CORPORATION, Hiroshima (JP)

(72) Inventors: Mitsuru Wakabayashi, Aki-gun (JP); Seisuke Mitsunaga, Aki-gun (JP); Hidekazu Shiraishi, Aki-gun (JP); Shingo Ono, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 162 days.

(21) Appl. No.: 17/072,819

(22) Filed: Oct. 16, 2020

(65) Prior Publication Data
US 2021/0229751 A1    Jul. 29, 2021

(30) Foreign Application Priority Data

Jan. 24, 2020 (JP) .............................. JP2020-009843

(51) Int. Cl.
| | |
|---|---|
| *B62D 25/08* | (2006.01) |
| *B62D 25/14* | (2006.01) |
| *B62D 21/15* | (2006.01) |
| *B60R 21/34* | (2011.01) |

(52) U.S. Cl.
CPC ........... *B62D 25/081* (2013.01); *B62D 21/15* (2013.01); *B62D 25/14* (2013.01); *B60R 21/34* (2013.01); *B60R 2021/343* (2013.01); *B62D 25/08* (2013.01)

(58) Field of Classification Search
CPC ...... B62D 25/081; B62D 21/15; B62D 25/14; B62D 25/08; B60R 2021/343; B60R 21/34

USPC ......................................................... 296/192
See application file for complete search history.

(56) References Cited

U.S. PATENT DOCUMENTS

| | | | | |
|---|---|---|---|---|
| 2012/0200118 A1* | 8/2012 | Yamagishi | ........... | B62D 25/163 296/193.11 |
| 2018/0244317 A1* | 8/2018 | Nakauchi | ............... | B62D 25/08 |

FOREIGN PATENT DOCUMENTS

JP          2009126480 A      6/2009

* cited by examiner

*Primary Examiner* — D Glenn Dayoan
*Assistant Examiner* — Dana D Ivey
(74) *Attorney, Agent, or Firm* — Studebaker & Brackett PC

(57) ABSTRACT

A cowl panel comprises an upper face portion where a windshield is joined, a forward protrusion portion extending downwardly from the upper face portion, protruding forwardly, a rearward protrusion portion extending downwardly from a rear lower end of the forward protrusion portion, protruding rearwardly, and a lower face portion extending forwardly from a lower end of the rearward protrusion portion. A reinforcing member which is positioned on a forward side of the forward protrusion portion and the rearward protrusion portion of the cowl panel and joined to the forward protrusion portion and the lower face portion is provided. The reinforcing member comprises a straight portion which substantially straightly extends downwardly from a joint part where the reinforcing member is joined to the forward protrusion portion, and the straight portion is provided with a fragile part.

15 Claims, 7 Drawing Sheets

VEHICLE-BODY STRUCTURE OF VEHICLE

BACKGROUND OF THE INVENTION

The present invention relates to a vehicle-body structure of a vehicle in which a reinforcing member is joined to a cowl panel which extends in a vehicle width direction and supports a lower portion of a windshield from a downward side of the vehicle.

The cowl panel is configured to be easily deformed downwardly by being formed in an S shape in a vehicle side view, for example, when in a vehicle front collision, a collision object rides over a vehicle front part and thereby a collision load is inputted to the windshield of the vehicle from an upward side of the vehicle.

Thus, the cowl panel can efficiently absorb the collision energy, so that the pedestrian protection performance against the collision is secured.

Meanwhile, the above-described easy deformation of the cowl panel may cause improper vibrations of the vehicle transmitted from a powertrain at a vehicle normal traveling. The windshield is supported by the cowl panel from the downward side of the vehicle at its lower portion. Accordingly, when the cowl panel vibrates, the windshield vibrates as well, so that booming noise may occur in a cabin of the vehicle. Consequently, there is a concern that the NVH (Noise, Vibration, Harshness) performance of the vehicle may be deteriorated.

Herein, as exemplified in Japanese Patent Laid-Open Publication No. 2009-126480, a structure in which a reinforcing member to reinforce the cowl panel is provided in order to suppress the vibration of the cowl panel at the vehicle normal traveling has been proposed.

A cowl member (100) which is disclosed as the cowl panel in the above-described patent document comprises a forward protrusion portion which is formed by a shelf portion (132) and an upper part of a vertical wall portion (120) and provided to protrude forwardly and a rearward protrusion portion which is formed by a lower part of the vertical wall portion (120) and a rearward side portion (152) and provided to protrude rearwardly.

The reinforcing member disclosed in the above-described patent document is a member which is provided at a front lower side of the cowl panel, interconnecting upper-and-lower sides of the rearward protrusion portion which is opened forwardly, and reinforces the cowl panel such that upper-and-lower protrusion portions of the cowl panel (particularly, the rearward protrusion portion which is configured to be larger than the forward protrusion portion) are suppressed from being improperly opened in a vehicle vertical direction, that is—an upper part of the rearward protrusion portion is suppressed from improperly vibrating in the vehicle vertical direction.

Herein, the reinforcing member is configured such that a bending portion (200s) configured to bend forwardly is formed at a central part, in the vehicle vertical direction, thereof and the reinforcing member comes to be crushed and deformed with a starting point of this bending portion (200s) when the collision load is inputted to the windshield from the upward side of the vehicle in the vehicle frontal collision, whereby efficient crushing deformation of the cowl panel is not hindered.

On the other hand, there is a concern that this crushing deformation of the bending portion (200s) may cause the reinforcing member to vibrate improperly at the vehicle normal traveling.

That is, while the structure disclosed in the above-described patent document compatibly improve the pedestrian protection performance and the NVH performance by proving the above-described reinforcing member, there is room for further improvement regarding the NVH performance.

SUMMARY OF THE INVENTION

The present invention has been devised in view of the above-described matter, and an object of the present invention is to provide a vehicle-body structure of a vehicle which can compatibly further improve the pedestrian protection performance in the vehicle frontal collision and the NVH performance at the vehicle normal traveling.

The present invention is a vehicle-body structure of a vehicle, comprising a windshield, a cowl panel supporting the windshield from a downward side, and a dash panel supporting the cowl panel from the downward side, wherein the cowl panel comprises an upper face portion where the windshield is joined, a forward protrusion portion which extends downwardly from the upper face portion, protruding forwardly, a rearward protrusion portion which extends downwardly from a lower end of the forward protrusion portion, protruding rearwardly, and a lower face portion which extends forwardly from a lower end of the rearward protrusion portion, and a reinforcing member which is positioned on a forward side of the cowl panel and joined to the forward protrusion portion and the lower face portion is provided, the reinforcing member comprises a straight portion which substantially straightly extends downwardly from a joint part where the reinforcing member is joined to the forward protrusion portion, and the straight portion is provided with a fragile part which is configured to be relatively fragile, compared to a peripheral portion, in a vertical direction, of the reinforcing member.

According to the present invention, when a front end part of the forward protrusion portion is deformed upwardly relative to a front lower end of the rearward protrusion portion, that is—when opening deformation of the rearward protrusion portion occurs, the load of the vehicle longitudinal direction which acts on the front end portion of the forward protrusion portion can be received by an axial force of the reinforcing member.

Thereby, the pedestrian protection performance in the vehicle frontal collision and the NVH performance at the vehicle normal traveling can be compatibly improved properly.

Herein, the above-described expression of "the reinforcing member comprises a straight portion which substantially straightly extends . . . " means that the present invention can include any structure in which an entire-range portion, in the vehicle vertical direction, of the reinforcing member is not linear but at least a portion of the reinforcing member which is located around the fragile part (breaking promotion portion) is substantially straight (liner).

In an embodiment of the present invention, the reinforcing member comprises an open section portion in which a cross section, in a direction perpendicular to a vehicle vertical direction, thereof has a corner portion and is opened forwardly or rearwardly, the fragile part is configured such that a sectional area, in the direction perpendicular to the vehicle vertical direction, of the open section portion is smaller than that of another portion, in the vehicle vertical direction, of the reinforcing member.

According to this embodiment, since the reinforcing member has the open section portion, the rigidity to suppress the vibration which may be caused by the opening deformation, in the vehicle vertical direction, of the rearward protrusion portion of the cowl panel at the vehicle normal traveling can be properly increased, and also when the collision load is inputted to the windshield from the upward side in the vehicle frontal collision, the reinforcing member can be broken and deformed securely through breaking of the open section portion.

In another embodiment of the present invention, the open section portion of the reinforcing member comprises a pair of side wall sections which respectively extend in a vehicle longitudinal direction, being spaced apart from each other in a vehicle width direction, and a front wall section which interconnects respective front ends of the pair of side wall sections in the vehicle width direction, the open section portion is configured to be continuous in the vehicle vertical direction, including the fragile part of the reinforcing member, and a lower end part of the side wall section is configured such that a length, in the vehicle longitudinal direction, thereof is relatively long, compared to another part, in the vehicle vertical direction, of the side wall section including the fragile part.

According to this embodiment, since the lower end part of the side wall section is configured such that the length, in the vehicle longitudinal direction, thereof is relatively long, compared to another part, in the vehicle vertical direction, of the side wall section, a lower portion of the reinforcing member can be suppressed from being broken improperly against the collision load inputted to the windshield from the upward side in the vehicle frontal collision, so that the reinforcing member can be broken and deformed securely at the fragile part.

In another embodiment of the present invention, a penetrating hole is provided at the fragile part.

According to this embodiment, since the fragile part can be made properly fragile (weak) by means of the penetrating hole, the secure breaking of the reinforcing member in the vehicle frontal collision can be attained at the fragile part.

In another embodiment of the present invention, the reinforcing member comprises a rearward projection portion which is provided to project rearwardly beyond the straight portion at a position below the straight portion.

According to this embodiment, the rearward projection portion as well as the fragile part can cause the breaking of the reinforcing member in the vehicle frontal collision. Further, in the breaking and deformation of the reinforcing member in the vehicle frontal collision, the reinforcing member can be broken and deformed such that its upper part positioned above the rearward projection portion falls down forwardly.

Consequently, the broken-and-deformed reinforcing member can attain the efficient energy absorption of the cowl panel in the vehicle frontal collision, without hindering the appropriate crushing deformation of the cowl panel having a S-shaped cross section (the forward protrusion portion and the rearward protrusion portion).

In another embodiment of the present invention, a flat-face portion which is flat-face shaped is formed at a front end part of the forward protrusion portion, and said joint part is joined to the flat-face portion.

According to this embodiment, since the joint part is joined to the flat-face portion formed at the front end part of the forward protrusion portion, the joint part can be joined to the flat-face portion firmly in a face-contact state and also an upper portion of the reinforcing member can be formed in a shape which extends straightly in the vehicle vertical direction, including the joint part.

Thereby, the opening deformation of the rearward protrusion portion of the cowl panel can be suppressed effectively by the axial force of the reinforcing member extending straightly in the vehicle vertical direction including the joint part at the vehicle normal traveling.

The present invention will become apparent from the following description which refers to the accompanying drawings.

DETAILED DESCRIPTION OF THE INVENTION

Figure 1:
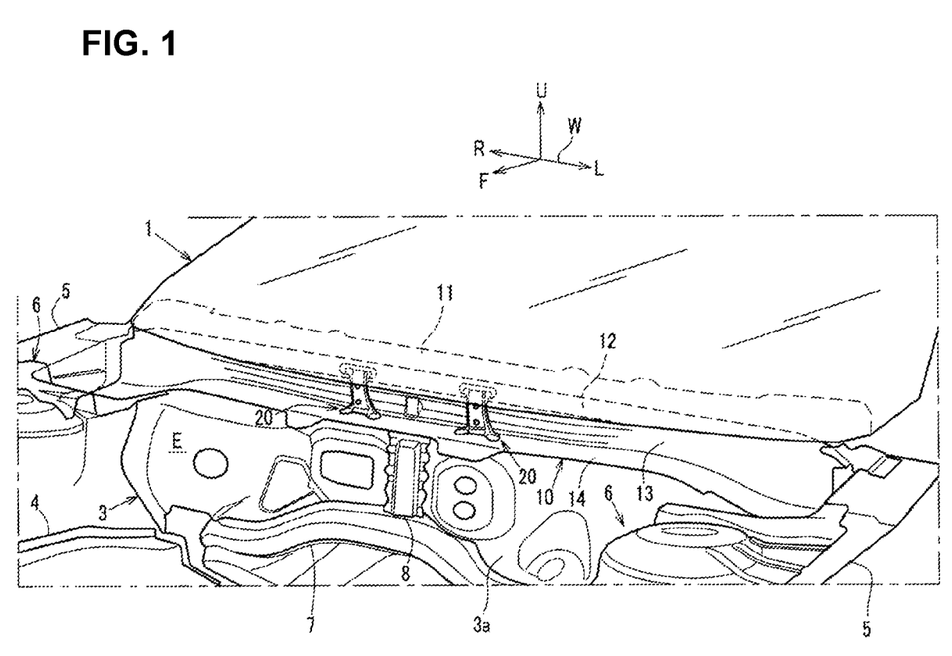
FIG. 1 is a perspective view of a major part of a vehicle-body structure of the present embodiment, when viewed obliquely from a forward, leftward and upward side.
Figure 2:
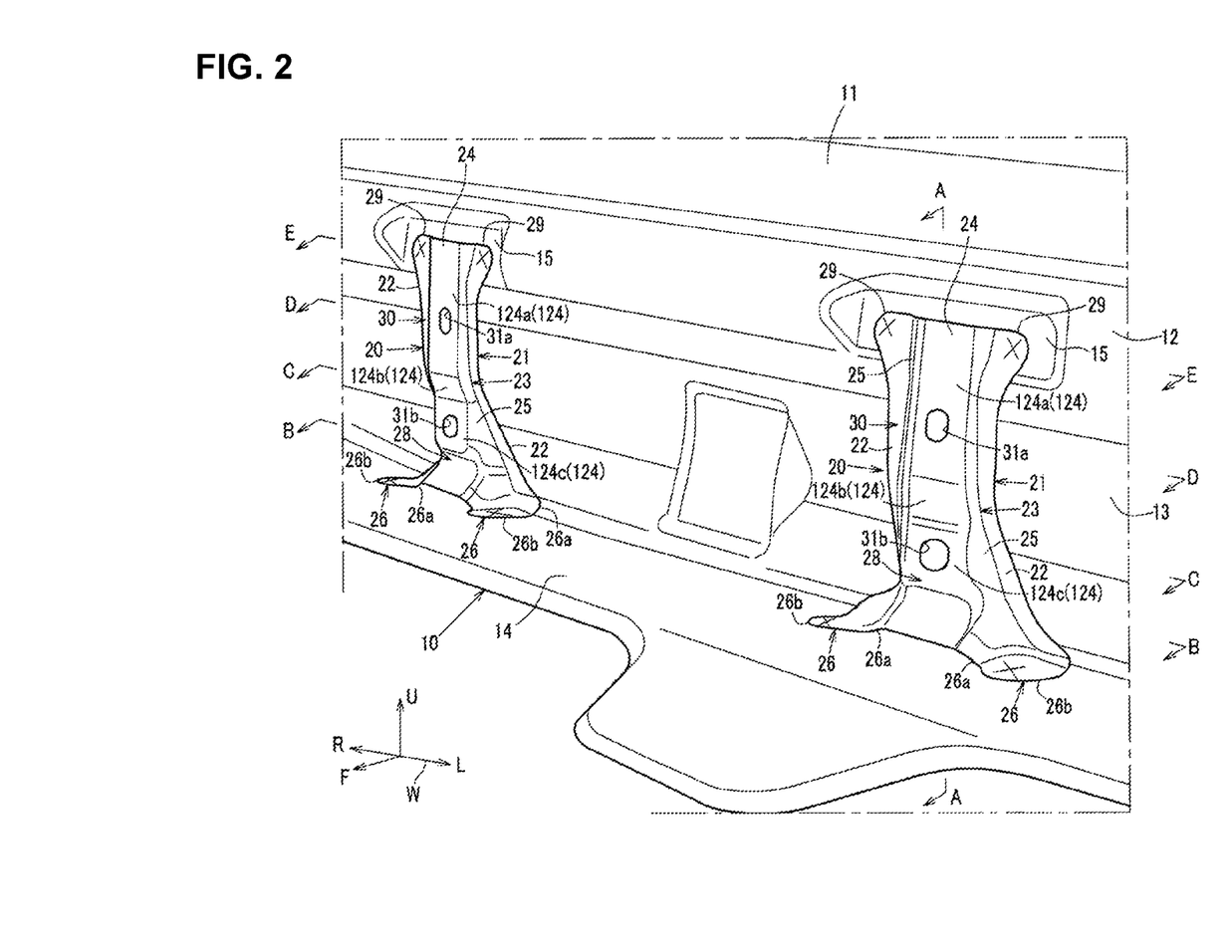
FIG. 2 is an enlarged perspective view of a cowl panel and a reinforcing member of the present embodiment, when viewed obliquely from the forward, leftward and upward side.
Figure 3:
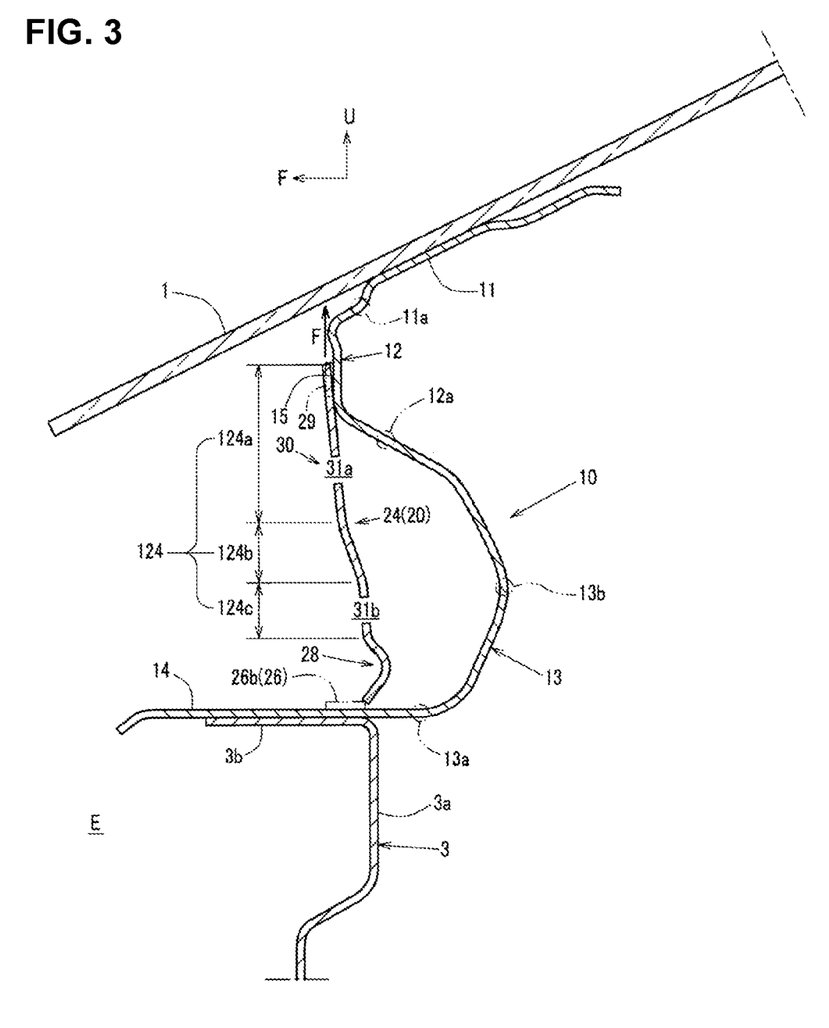
FIG. 3 is a sectional view taken along line A-A of FIG. 2.
Figure 4:
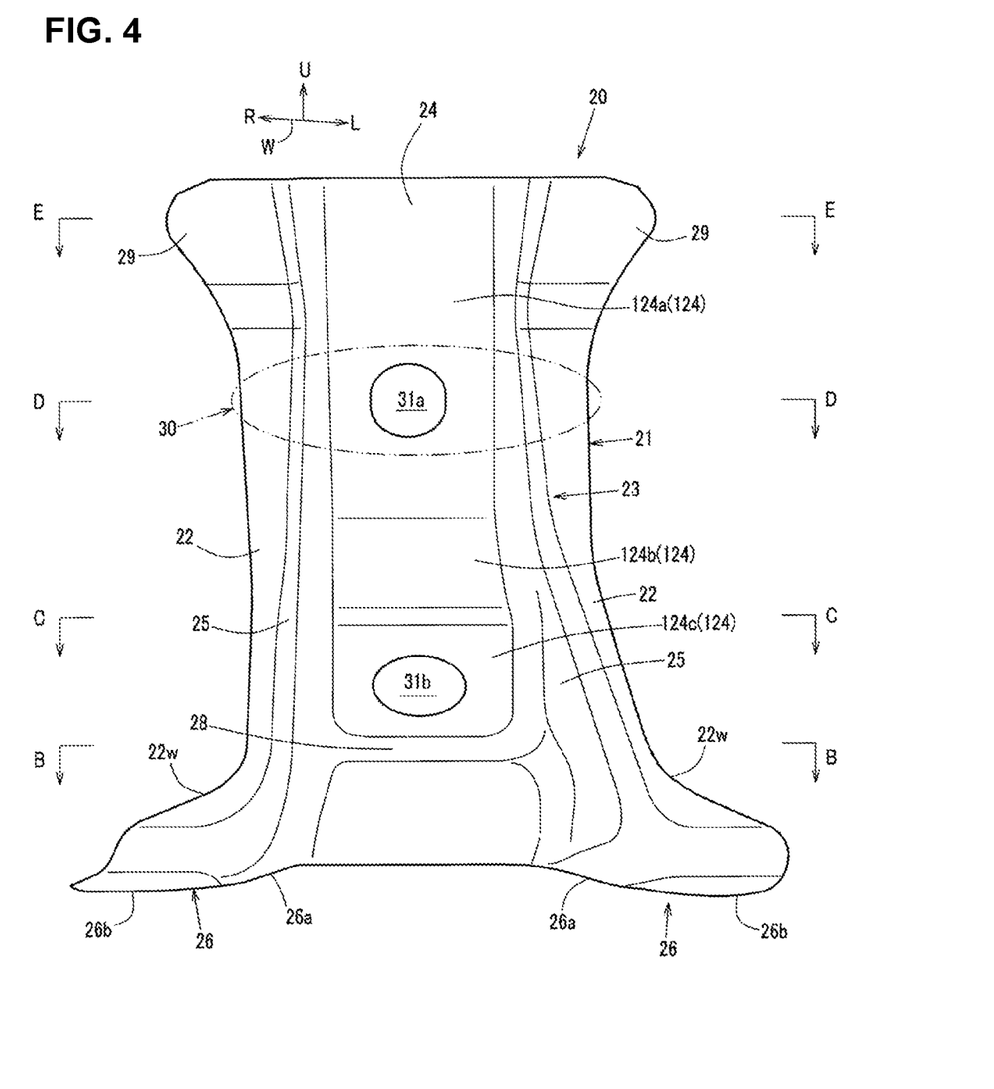
FIG. 4 is an elevational view of the reinforcing member of the present embodiment.
Figure 5:
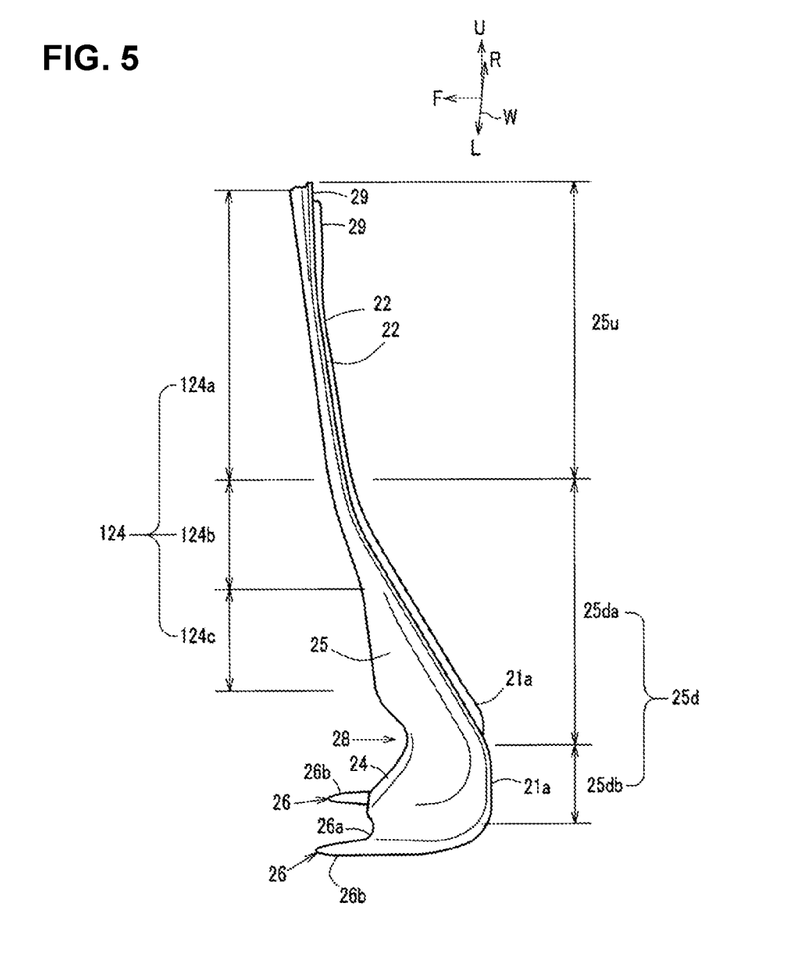
FIG. 5 is a left-side face view of the reinforcing member of the present embodiment.
Figure 6A:
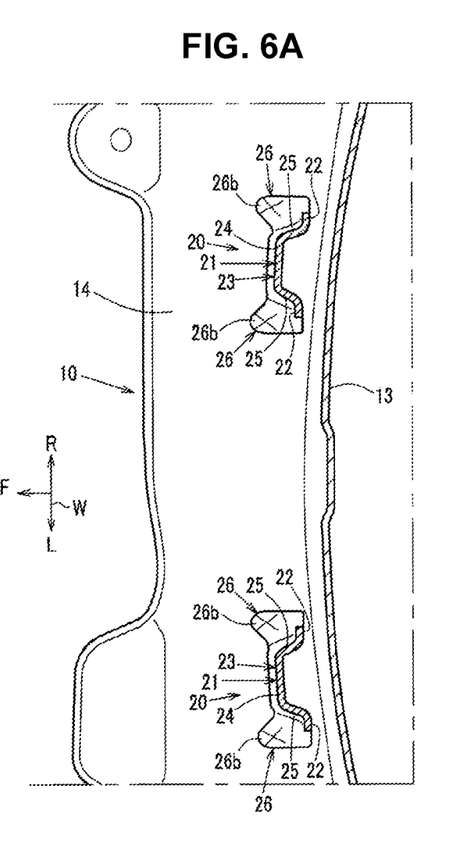
FIG. 6A is a sectional view taken along line B-B of FIG. 2.
Figure 6B:
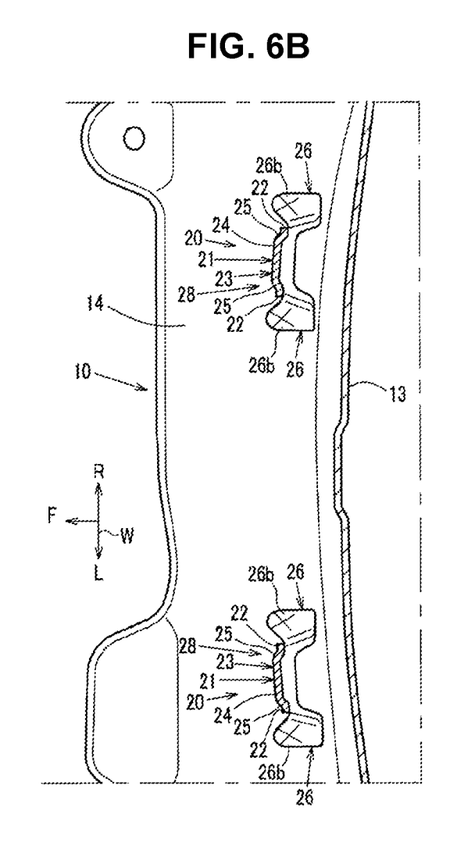
FIG. 6B is a sectional view taken along line C-C of FIG. 2.
Figure 7A:
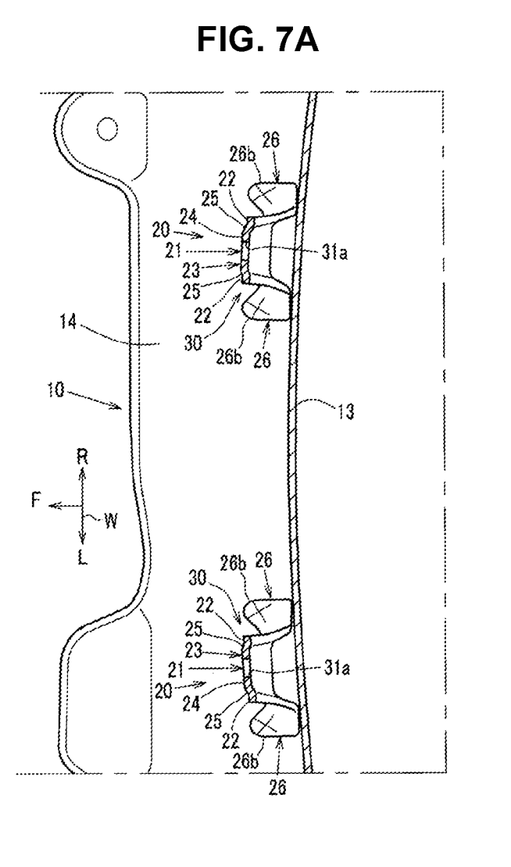
FIG. 7A is a sectional view taken along line D-D of FIG. 2.
Figure 7B:
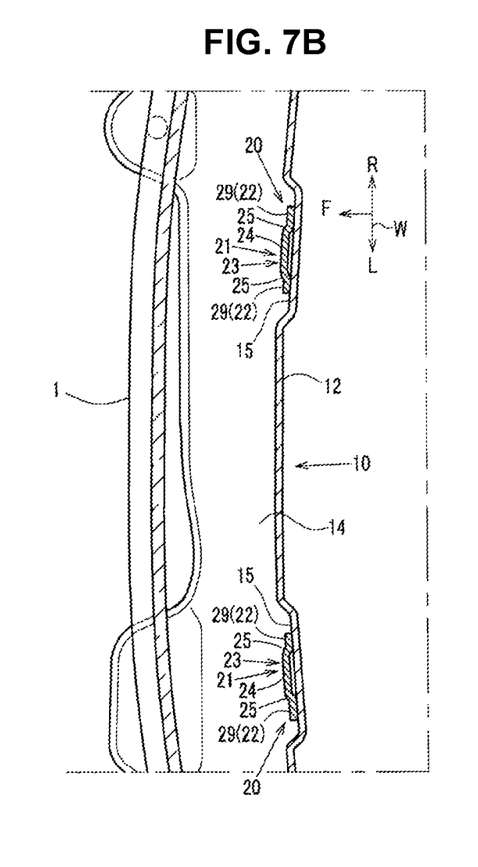
FIG. 7B is a sectional view taken along line E-E of FIG. 2.

Hereafter, an embodiment of the present invention will be described specifically. FIG. 1 is a perspective view of a major part of a vehicle-body structure of the present embodiment, when viewed obliquely from a forward, leftward and upward side, FIG. 2 is an enlarged perspective view of a cowl panel and a reinforcing member of the present embodiment, when viewed obliquely from the forward, leftward and upward side, and FIG. 3 is a sectional view taken along line A-A of FIG. 2. FIG. 4 is an elevational view of the reinforcing member of the present embodiment, specifically, the elevational view of the reinforcing member, when viewed from a slightly leftward side. FIG. 5 is a left-side face view of the reinforcing member of the present embodiment, specifically, the left-side view of the reinforcing member, when viewed obliquely from a slightly rearward and upward side. FIG. 6A is a sectional view taken along line B-B of FIG. 2 or FIG. 4, FIG. 6B is a sectional view taken along line C-C of FIG. 2 or FIG. 4, FIG. 7A is a sectional view taken along line D-D of FIG. 2 or FIG. 4, and FIG. 7B is a sectional view taken along line E-E of FIG. 2 or FIG. 4.

In the figures, a direction denoted by an arrow F shows a forward side of the vehicle, a direction denoted by an arrow U shows an upward side of the vehicle, a direction denoted by an arrow W shows a vehicle width direction, a direction denoted by an arrow R shows a rightward side of the vehicle, and a direction denoted by an arrow L shows a leftward side of the vehicle. Herein, illustration of a windshield (front window) 1 is omitted in FIG. 2.

A basic structure of the vehicle-body structure will be described first before describing a cowl panel 10 and a reinforcing member 20 which the vehicle-body structure of the present embodiment comprises.

As shown in FIGS. 1-3, the windshield 1 (see FIGS. 1 and 3), the cowl panel 10 which supports the windshield 1 from the downward side of the vehicle, and a dash panel 3 which supports the cowl panel 10 from the downward side of the vehicle are provided at a front part of the vehicle of the present embodiment.

Further, as shown in FIG. 1, at the front part of the vehicle of the present embodiment are provided a pair of right-and-left front side frames 4 (the right-side one is illustrated only) which are provided to be spaced apart from each other in the vehicle width direction, a pair of right-and-left apron reinforcements 5 which are provided on an outward side, in a vehicle width direction, of and on an upward side of the right-and-left side frames 4, and a pair of right-and-left suspension towers 6 which support respective upper portions of a pair of right-and-left suspensions (not illustrated).

The front side frame 4 and the apron reinforcement 5 are provided to extend in a vehicle longitudinal direction on rightward and leftward sides of the vehicle, respectively. Each of the right-and-left suspension towers 6 interconnects a rear portion of the front frame 4 and a rear portion of the apron reinforcement 5, and is arranged at a position which is forwardly spaced apart from the dash panel 3.

As shown in FIGS. 1 and 3, the dash panel 3 is positioned at a rear end part of an engine room E and comprises a vertical wall portion 3a which extends along a nearly entire width, in the vehicle width direction, of the vehicle and also extends in a vehicle vertical direction and an upper-end flange portion 3b (see FIG. 3) which forwardly extends substantially horizontally from an upper end of the vertical wall portion 3a and supports the cowl panel 10 from the downward side of the vehicle, which are formed integrally.

A rear end portion of each of the right-and-left front side frames 4 is joined to a lower end portion of the vertical wall portion 3a (see FIG. 1). As shown in FIG. 1, a rear end portion of each of the right-and-left front side frames 4 is connected to a front face portion of the vertical wall portion 3a, and a dash cross member 7 which extends in the vehicle width direction is attached to the front face portion of the vertical wall portion 3a so as to form a closed cross section therebetween.

In FIG. 1, reference character 8 denotes a gusset which extends in the vehicle vertical direction and connects the cowl panel 10 and the dash cross member 7 at a central portion, in the vehicle width direction, of the vertical wall portion 3a of the dash panel 3. This gusset 8 is joined to the front face portion of the vertical wall portion 3a of the dash panel 3 so as to form a closed cross section extending in the vehicle vertical direction therebetween.

As shown in FIG. 1, the cowl panel 10 cantilever-supports a lower end of the windshield 1 which extends along the nearly entire width, in the vehicle width direction, of the vehicle and extends obliquely forwardly-and-downwardly over a nearly entire length, in the vehicle width direction, of the windshield 1.

As shown in FIG. 3, the cowl panel 10 is made by forming a metal plate in a nearly S shape in a vehicle side view (a perpendicular cross-section view to the vehicle vertical direction). Specifically, the cowl panel 10 comprises an upper face portion 11 where the windshield 1 is joined, a forward protrusion portion 12 which extends downwardly from the upper face portion 11, protruding forwardly and curving, a rearward protrusion portion 13 which extends downwardly from the forward protrusion portion 12, protruding rearwardly and curving, and a lower face portion 14 which forwardly extends substantially horizontally from a lower end of the rearward protrusion portion 13, which are formed integrally.

The upper face portion 11 of the cowl panel 10 extends from an upper end (11a) of the forward protrusion portion 12 along the oblique-shaped windshield 1. The upper face portion 11 of the cowl panel 10 is bonded to a lower face of a lower portion of the windshield 1 with an adhesive (not illustrated). Thus, the lower portion of the windshield 1 is supported by the cowl panel 10.

The forward protrusion portion 12 is configured, in the vehicle side view, to extend obliquely downwardly-and-forwardly from a front lower end 11a of the upper face portion 11 and then extend obliquely downwardly-and-rearwardly from its front end, as an inflection point, up to an upper end (12a) of the rearward protrusion portion 13. Thus, the forward protrusion portion 12 is configured to protrude forwardly as a whole. In other words, the forward protrusion portion 12 is configured to be opened rearwardly in the vehicle side view.

As shown in FIGS. 2, 3 and 7B, a flat face portion 15 which is of a flat shape is formed at a foremost protrusion portion of the forward protrusion portion 12 which protrudes forwardly the most, i.e., a front end of the forward protrusion portion 12. The flat face portion 15 is formed at a front face of the front end of the forward protrusion portion 12 and this flat face portion 15 becomes a base face where a reinforcing member 20, described later, can be joined from the forward side of the vehicle.

As shown in FIG. 3, the rearward protrusion portion 13 is configured, in the vehicle side view, to extend obliquely downwardly-and-rearwardly from a rear lower end 12a of the forward protrusion portion 12 and then extend obliquely downwardly-and-forwardly from its rear end 13b, as an inflection point, up to a rear end (13a) of the lower face portion 14. Thus, the rearward protrusion portion 13 is configured to protrude rearwardly as a whole. In other words, the rearward protrusion portion 13 is configured to be opened forwardly in the vehicle side view.

The rearward protrusion portion 13 has a larger size than the forward protrusion portion 12 in the vehicle side view. Specifically, the rearward protrusion portion 13 is configured such that an opening length, in the vehicle vertical direction, thereof is greater (longer) than that of the forward protrusion portion 12 and a protrusion length, in the vehicle longitudinal direction, thereof is greater (longer) than that of the forward protrusion portion 12.

The lower face portion 14 extends substantially horizontally from a front lower end 13a of the rearward protrusion portion 13.

The above-described cowl panel 10 is joined to the upper-end flange portion 3b of the dash panel 3 from the upward side of the vehicle at the lower face portion 14 by spot welding applied to plural points. Thereby, the cowl panel 10 is supported by the dash panel 3 from the upward side as described above.

Further, as shown in FIGS. 1 and 2, a pair of right-and-left reinforcing members 20 to reinforce the cowl panel 10 are provided at the front part of the vehicle of the present embodiment. These reinforcing members 20 are provided to be spaced apart from each other in the vehicle width direction at a point positioned near a center, in the vehicle width direction, of the cowl panel 10. As shown in FIGS. 1-3, each of the reinforcing members 20 is provided to interconnect the forward protrusion portion 12 and the lower face portion in front of the rearward protrusion portion 13. Since these two reinforcing members 20 have the same shape, the following description will be based on the right-side reinforcing member 20 except a particular case.

Specifically, the reinforcing member 20 is arranged such that it is directed slightly outwardly, in the vehicle width direction, relative to the forward side of the vehicle according to the curved shape of the cowl panel 10 in which a central part, in the vehicle width direction, of the cowl panel 10 protrudes slightly forwardly (see FIGS. 6A, 6B, 7A and 7B). However, for convenience sake, the followings will be described, assuming that a longitudinal direction and a width direction of the reinforcing member 20 respectively match the vehicle longitudinal direction and the vehicle width direction.

As shown in FIG. 2, the reinforcing member 20 comprises a hat-shaped sectional portion 21 and a pair of right-and-left lower joint-flange portions 26 which support the hat-shaped sectional portion 21, which are integrally made of a flat-plate shaped steel material.

The hat-shaped sectional portion 21 extends continuously over a nearly entire part, in the vehicle vertical direction, of the reinforcing member 20, and as shown in FIGS. 2, 4, 5, 6A, 6B, 7A and 7B, this portion 21 comprises an open section portion 23 in which a cross section, in a direction perpendicular to the vehicle vertical direction, thereof is opened rearwardly and a pair of right-and-left flange portions 22 which respectively extend substantially horizontally in the vehicle width direction.

The open section portion 23 comprises a front wall section 24 which extends substantially horizontally in the vehicle width direction in a cross section perpendicular to the vehicle vertical direction and a pair of right-and-left side wall sections 25 which respectively extend rearwardly from both ends, in the vehicle width direction, of the front wall section 24, which are integrally formed. The pair of right-and-left flange portions 22 extend substantially horizontally in an opposite direction, in the vehicle width direction, from respective rear ends of the right-and-left side wall sections 25.

As shown in FIGS. 2, 4 and 5, the pair of right-and-left lower joint-flange portions 26 are formed at a lower portion of the reinforcing member 20 so as to support the hat-shaped sectional portion 21 from the downward side. Each of the lower joint-flange portions 26 comprises a leg part 26*a* which is formed by extending downwardly the flange portion 22 and the side wall section 25 beyond a lower end of the front wall section 24 and a lower-end flat face part 26*b* which is bent substantially horizontally from a lower end of the leg part 26*a*.

The lower-end flat face part 26*b* is configured such that a portion of the leg part 26*a* of the lower joint-flange portion 26 which corresponds to the lower end of the flange portion 22 forwardly protrudes substantially horizontally beyond the lower end of the front wall section 24 and a portion of the leg part 26*a* of the lower joint-flange portion 26 which corresponds to the lower end of the side wall section 25 outwardly protrudes substantially horizontally beyond an outward end, in the vehicle width direction, of the flange portion 22.

Thus, the lower-end flat face part 26*b* is formed in a flat face shape, in a vehicle plan view, so that this lower-end flat face part 26*b* can be joined to the lower face portion 14 of the cowl panel 10 from the upward side. Herein, as shown in FIG. 4, a lower section of the flange portion 22 is configured as a wide part 22*w*, the width, in the elevational view, of which becomes larger as it goes downwardly up to the lower end of the leg part 26*a* of the lower joint-flange portion 26.

As shown in FIGS. 2, 4, 5 and 7B, an upper joint-flange portion 29 which is joined to the forward protrusion portion 12 of the cowl panel 10 from the forward side is formed at an upper part of each of the right-and-left flange portions 22. That is, the upper joint-flange portions 29 constitute a part of the flange portions 22, and extend substantially horizontally from respective rear ends of the right-and-left side wall sections 25 in the opposite direction in the vehicle width direction, thereby constituting a part of the hat-shaped sectional portion 21 as well.

The upper joint-flange portion 29 is configured such that its width is larger than that of a portion of the flange portion 22 which is located right below the upper joint-flange portion 29 (see FIG. 4). A rear face of the upper joint-flange portion 29 is formed in a flat-face shape extending in the vehicle vertical direction and in the vehicle width direction.

Further, the upper joint-flange portion 29 is spot-welded to the flat face portion 15 positioned at the front end of the forward protrusion portion 12 from the forward side as shown in FIGS. 2, 3 and 7B, and the lower joint-flange portion 26 is spot-welded to the flat face portion 14 of the cowl panel 10 from the upward side as shown in FIGS. 2, 3, 6A, 6B and 7A (see marks X shown in FIGS. 2, 6A, 6B and 7A).

Specifically, the lower joint-flange portion 26 is, as shown in FIG. 3, joined to the lower face portion 14 of the cowl panel 10 which is positioned on the forward side of the front lower end 13*a* of the rearward protrusion portion 13. That is, the lower joint-flange portion 26 is joined to the upper-end flange portion 3*b* of the dash panel 3 which is positioned right below the lower face portion 14 of the cowl panel 10 via this lower face portion 14 (see FIG. 3).

Herein, as shown in FIG. 3, the lower joint-flange portion 26 is joined to or around a portion of the lower face portion 14 of the cowl panel 10 which is positioned right below a front end (15) of the forward protrusion portion 12.

By joining the lower joint-flange portion 26 to the above-described point, the lower joint-flange portion 26 can be arranged at a point, in the vehicle longitudinal direction, of the lower face portion 14 of the cowl panel 10 which is positioned closely to the front lower end 13*a* of the rearward protrusion portion 13, without interfering with the rearward protrusion portion 13. Thereby, since the reinforcing member 20 is positioned on the forward side of the cowl panel 10, any interference of the reinforcing member 20 with some component placed right before the reinforcing member 20, such as a link mechanism for driving a wiper, can be properly suppressed.

Further, as shown in FIGS. 2-5, the flat face portion 15 positioned at the front end of the forward protrusion portion 12 is formed in the flat-face shape which is directed to the forward side of the vehicle as described above. Accordingly, the reinforcing member 20 can be joined in a state where the upper joint-flange portions 29 formed at the upper parts of the flange portions 22 extending in the vehicle vertical direction face-contact the flat-face portion 15 of the forward protrusion portion 12 from the forward side of the vehicle. Thereby, as shown in FIG. 3, the reinforcing member 20 can be configured to downwardly extend substantially straightly from the upper end, including the upper joint-flange portions 29.

As shown in FIGS. 3-5 and 6B, a rearward projection section 28 which projects rearwardly is formed at a lower part of the open section portion 23 (at a level, in the vehicle vertical direction, of the open section portion 23 which corresponds to an upper end portion of the wide part 22*w*

(see FIG. 4) formed at the lower part of the flange portion 22 in the present embodiment).

The rearward projection section 28 is configured such that an entire part, in the vehicle width direction, of the front wall section 24 partially projects rearwardly relative to a peripheral portion, in the vehicle vertical direction, of the front wall section 24 in the vehicle side view (see FIG. 6B). Thus, when the collision load is inputted to the windshield 1 from the upward side in the vehicle frontal collision and thereby a breaking promotion portion 30 (which will be described later) causes the reinforcing member 20 to be broken and deformed, the reinforcing member 20 is broken and deformed such that its upper part positioned above the rearward projection portion 28 falls down forwardly.

As shown in FIG. 3, the rearward projection portion 28 is configured to have the largest rearward-projection degree in a vertical range of the front wall section 24.

The front wall section 24 is configured to have a nearly constant width (length in the vehicle width direction) over an entire length, in the vehicle vertical direction, thereof and to have a nearly straight (linear) shape along the vehicle vertical direction, except the rearward projection portion 28 as shown in FIG. 3.

The reinforcing member 20 is configured such that the front wall section 24 extends substantially straightly over the entire length, in the vehicle vertical direction, thereof, and the upper joint-flange portions 29 and the lower joint-flange portions 26 are respectively joined to the forward protrusion portion 12 of the cowl panel 10 and the lower face portion 14 of the cowl panel 10 as described above. Thus, as shown in FIG. 3, the reinforcing member 20 is provided on the forward side of the cowl panel 10 such that it interconnects the forward protrusion portion 12 and the lower face portion 14 substantially straightly in the vehicle vertical direction.

The front wall section 24 includes, as show in FIG. 3, a front-wall straight portion 124 which extends substantially straightly in the vehicle vertical direction of the front wall section 24 between an upper end, in the vehicle vertical direction, of the front wall section 24 and a portion of the front wall section 24 which is positioned right above the rearward projection portion 28. The front-wall straight portion 124 has a front-wall upper straight part 124a, a front-wall middle straight part 124b, and a front-wall lower straight part 124c in order from the upward side to the downward side of the vehicle. While the front-wall upper straight part 124a and the front-wall lower straight part 124c extend straightly in the vehicle vertical direction, the front-wall lower straight part 124c is provided to be slightly rearwardly offset from the front-wall upper straight part 124a.

The front-wall middle straight part 124b extends obliquely relative to the vertical direction, straightly connecting a lower end of the front-wall upper straight part 124a and an upper end of the front-wall lower straight part 124c. Herein, as shown in FIGS. 3 and 5, the lower end of the front-wall upper straight part 124a (i.e., an upper end of the front-wall middle straight part 124b) is located at a nearly central level, in the vehicle vertical direction, of the reinforcing member 20 in the present embodiment.

As shown in FIGS. 2-4 and 7A, B, the breaking promotion portion 30 as a fragile part is provided at an upper portion of the reinforcing member 20, specifically at a nearly central portion, in the vehicle vertical direction, of the front-wall upper straight part 124a. In other words, the breaking promotion portion 30 is formed at a portion of the reinforcing member 20 which is located at a slightly lower level, in the vehicle vertical direction, than the upper joint-flange portions 29.

The breaking promotion portion 30 is configured to be relatively fragile (weak), compared to the other portion, in the vehicle vertical direction, of the reinforcing member 20, so that this breaking promotion portion 30 can become a breaking causing point of the reinforcing member 20 where the reinforcing member 20 comes to be broken when the collision load is inputted to this reinforcing member 20 from the upwardly-positioned windshield 1 in the vehicle frontal collision.

Specifically, a penetrating hole 31a as a service hole is provided to penetrate the breaking promotion portion 30 of the front wall section 24 in the vehicle longitudinal direction (the plate-thickness direction). This penetrating hole 31a is formed in a shape of an elongated hole extending in the vehicle vertical direction in the elevational view.

Thus, the breaking promotion portion 30 is relatively fragile, compared to the other portion, in the vehicle vertical direction, of the reinforcing member 20.

In the present embodiment, as shown in FIGS. 2-4, another penetrating hole 31b as another service hole is formed at the front wall section 24 at a position which is downwardly spaced apart, in the vehicle vertical direction, from the above-described penetrating hole 31a formed at the breaking promotion portion 30. This lower-side penetrating hole 31b is formed in a shape of an elongated hole extending in the vehicle with direction in the elevational view.

The side wall section 25 is formed continuously over the nearly entire length, in the vehicle vertical direction, of the reinforcing member 20, which corresponds to the open section portion 23. The side wall section 25 is configured, as shown in FIG. 5, such that a length, in the vehicle longitudinal direction, of a side-wall lower portion 25d is longer than that of a side-wall upper portion 25u. Herein, the side-wall upper portion 25u is located at a higher level than the side-wall lower portion 25d, where the above-described breaking promotion portion 30 is formed.

In the present embodiment, as shown in FIG. 5, the side wall section 25 is configured such that the length, in the vehicle longitudinal direction, of the side-wall lower portion 25d which is located at a lower level than the lower end of the front-wall upper straight part 124a is longer than that of the side-wall upper portion 25u which is located at a higher level than the lower end of the front-wall upper straight part 124a.

The side-wall upper portion 25u is configured to have a substantially-constant rearward projection length over the entire length, in the vehicle vertical length, thereof. Meanwhile, the side-wall lower portion 25d is configured to gradually project rearwardly as it goes downwardly in an area 25da (an upper-side area of the side-wall lower portion 25d) from a level of the lower end of the front-wall upper straight part 124a to a level of the rearward projection portion 28. Further, the side-wall lower portion 25d downwardly extends substantially straightly in an area 25db (an lower-side area of the side-wall lower portion 25d) from the rearward projection portion 28 to around the lower end of the side wall section 25. Thus, as described above, the side wall section 25 is configured such that the side-wall lower portion 25d is longer than the side-wall upper portion 25u in the vehicle longitudinal direction.

Further, the open section portion 23 comprises the front wall section 24 which has the substantially constant vehicle-width-direction length over its nearly entire vehicle-vertical-direction length as described above and the side wall section 25 which extends rearwardly relative to the front wall portion 24 as described above.

Accordingly, the open section portion 23 is configured such that its portion which corresponds to the lower area 25db of the side-wall lower portion 25d has the largest cross section perpendicular to the vehicle vertical direction, except a portion corresponding to the rearward projection portion 28.

By configuring the lower part of the open section portion 23 to have the larger cross section perpendicular to the vehicle vertical direction than its upper part as described above, when the collision load is inputted to the reinforcing member 20 from the upward side in the vehicle frontal collision, the reinforcing member 20 gets broken securely at the breaking promotion portion 30 without its lower portion's having buckling.

Further, by configuring the side-wall lower portion 25d to project rearwardly beyond the side-wall upper portion 25u as described above, each of the pair of right-and-left flange portions 22 is configured such that a lower part 21a (referred to as a "flange lower part 21a") which is located at the lower level than a lower end of the front-wall upper straight part 124a (see FIG. 5) is formed along a rear edge of the side wall section 25 in the vehicle side view such that this part 21a projects obliquely downwardly-and-rearwardly.

As shown in FIG. 7A, the breaking promotion portion 30 of the reinforcing member 20 is configured such that a length, in the vehicle longitudinal direction, of the side wall section 25 is the shortest.

That is, while the breaking promotion portion 30 is configured, similarly to the other portion, in the vehicle vertical direction, of the open section portion 23, such that its cross section perpendicular to the vehicle vertical direction is of the hat shape, the vehicle-longitudinal-direction length of the side wall section 25 at the breaking promotion portion 30 is so short that the breaking promotion portion 30 seems to be of a nearly flat-plate shape as a whole because of the front wall section 24 extending in the vehicle width direction (see FIG. 7A).

Thereby, the reinforcing member 20 can be configured such that the sectional area of the open section portion 23 which is perpendicular to the vehicle vertical direction is the smallest at the breaking promotion portion 30.

Moreover, the breaking promotion portion 30 can be configured to be relatively fragile, compared to the other portion, in the vehicle vertical direction, of the reinforcing member 20 by forming the upper-side penetrating hole 31a at the front wall section 24.

The above-described vehicle-body structure of the vehicle of the present embodiment comprises, as shown in FIG. 1, the windshield 1, the cowl panel 10 supporting the windshield 1 from the downward side, and the dash panel 3 supporting the cowl panel 10 from the downward side. Further, as shown in FIGS. 1-3, the cowl panel 10 comprises the upper face portion 11 where the windshield 1 is joined, the forward protrusion portion 12 which extends downwardly from the upper face portion 11, protruding forwardly, the rearward protrusion portion 13 which extends downwardly from the rear lower end 12a (see FIG. 3) of the forward protrusion portion 12, protruding rearwardly, and the lower face portion 14 which extends forwardly from the lower end of the rearward protrusion portion 13. Further, the vehicle-body structure of the vehicle of the present embodiment comprises, as shown in FIGS. 1-4 and 7A, the reinforcing member 20 which is positioned on the forward side of the forward protrusion portion 12 and the rearward protrusion portion 13 of the cowl panel 10 and joined to the forward protrusion portion 12 and the lower face portion 14. The reinforcing member 20 comprises, as shown in FIGS. 2-4, the front-wall straight portion 124 (straight portion) which substantially straightly extends downwardly from the upper joint-flange portions 29 (joint part) where the reinforcing member 20 is joined to the forward protrusion portion 12, and the front-wall straight portion 124 is provided with the breaking promotion portion 30 (fragile part) which is configured to be relatively fragile, compared to the peripheral portion, in the vertical direction, of the reinforcing member 20.

According to the above-described vehicle-body structure of the vehicle, the pedestrian protection performance and the NVH performance can be compatibly improved properly. Specifically, the vehicle-body structure of the vehicle of the present embodiment comprises the front-wall straight portion 124 extending substantially straightly in the vehicle vertical direction is provided at the reinforcing member 20. Thereby, when the front end part (15) of the forward protrusion portion 12 is deformed upwardly relative to the front lower end (13a) of the rearward protrusion portion 13, that is—when opening deformation of the rearward protrusion portion 13 occurs, which may be caused to the cowl panel 10 by vibrations of a powertrain (not illustrated) disposed in the engine room E or the like at the vehicle normal traveling, a load F (see FIG. 3) of the vehicle longitudinal direction which acts on the front end portion (15) of the forward protrusion portion 12 can be received by an axial force of the reinforcing member 20.

Thereby, the cowl panel 10 is suppressed from vibrating such that the opening deformation of the rearward protrusion portion 13 occurs at the vehicle normal traveling, thereby properly improving the NVH performance.

Further, when the collision load (large load) is inputted to the windshield 1 from the upward side in the vehicle frontal collision, the breaking promotion portion 30 causes the breaking deformation of the reinforcing member 20. Thereby, crushing deformation of the cowl panel 10 can be hindered by the reinforcing member 20.

Thus, the cowl panel 10 can efficiently absorb the collision energy in the vehicle frontal collision, so that the pedestrian protection performance against the collision can be secured.

As shown in FIGS. 2, 4, 5, 6A,B and 7A,B, in the embodiment of the present invention, the reinforcing member 20 comprises the U-shaped (gate-shaped) open section portion 23 in which the cross section, in the direction perpendicular to the vehicle vertical direction, thereof has a corner portion and is opened rearwardly, the breaking promotion portion 30 is configured, as shown in FIGS. 2, 3 and 7A, such that the sectional area, in the direction perpendicular to the vehicle vertical direction, of the open section portion 23 is smaller than that of the other portion, in the vehicle vertical direction, of the reinforcing member 20.

According to this structure, since the reinforcing member 20 has the open section portion 23, the bending rigidity against the vibration which may be caused by the opening deformation, in the vehicle vertical direction, of the rearward protrusion portion 13 of the cowl panel 10 at the vehicle normal traveling is so properly increased that improper buckling cannot occur.

Meanwhile, since the breaking promotion portion 30 is configured to be relatively fragile, compared to the other portion, in the vehicle vertical direction, of the reinforcing member 20, when the large collision load is inputted to the windshield 1 from the upward side, the reinforcing member 20 can be broken and deformed securely through breaking of the open section portion 30.

Thus, the breaking deformation of the reinforcing member 20 in the vehicle frontal collision can be attained properly.

That is, since the breaking promotion portion 30 causes the breaking deformation of the reinforcing member 20 securely, it can be properly prevented that the crushing deformation of the cowl panel 10 is hindered by the reinforcing member 20.

Accordingly, the cowl panel 10 is reinforced by the reinforcing member 20 at the vehicle normal traveling so as not to be crushed, and also the efficient absorption of the collision load by the crushing deformation of the cowl panel 10 in the vehicle frontal collision can be attained through the breaking deformation of the reinforcing member 20.

Herein, the reinforcing member 20 has the hat-shaped sectional portion 21 which is opened rearwardly in the sectional view perpendicular to the vehicle vertical direction at a part, in the vehicle vertical direction, thereof (in the present embodiment, over the nearly entire length thereof, except the lower joint-flange portion 26) (see FIGS. 2, 4, 5, 6A,B and 7A,B). This hat-shaped sectional portion 21 is constituted by the open section portion 23 and a pair of flange portions 22 which project in the opposite direction, in the vehicle width direction, from respective rear ends of the side wall sections 25 provided at the both sides of the open section portion 23.

Thus, by arranging the reinforcing member 20 such that the hat-shaped sectional portion 21 is opened rearwardly, smoother forward breaking of the reinforcing member 20 can be attained in the vehicle frontal collision, compared to a case where the reinforcing member 20 is arranged such that the hat-shaped sectional portion 21 is opened forwardly.

Specifically, the pair of flange portions 22 can be positioned on the rearward side of the open section portion 23 (see the same figures) by arranging the reinforcing member 20 such that the hat-shaped sectional portion 21 is opened rearwardly.

Thereby, when the reinforcing member 20 is broken and deformed at the breaking promotion portion 30 in such a manner that this member 30 protrudes forwardly in the vehicle frontal collision, a compressive force of the vehicle vertical direction acts on the flange portions 22 provided at the rearward side of the reinforcing member 20.

Herein, since the flange portion 22 is configured to be of the flat-plate shape extending in the vehicle vertical direction and in the vehicle width direction, this flange portion 22 shows the strong resistance against tension acting in the vehicle vertical direction, but shows the weak resistance against compression acting in the vehicle vertical direction.

Therefore, when the reinforcing member 20 is broken and deformed at the breaking promotion portion 30 in such a manner that this member 30 protrudes forwardly in the vehicle frontal collision, this breaking/deformation is not hindered by the flange portions 22.

Accordingly, by arranging the reinforcing member 20 such that the hat-shaped sectional portion 21 is opened rearwardly as described above, the smoother forward breaking of the reinforcing member 20 can be attained in the vehicle frontal collision, compared to the case where the reinforcing member 20 is arranged such that the hat-shaped sectional portion 21 is opened forwardly.

In the present embodiment, as shown in FIGS. 2 and 4-7A, B, the open section portion 23 of the reinforcing member 20 comprises the pair of side wall sections 25 which respectively extend in the vehicle longitudinal direction, being spaced apart from each other in the vehicle width direction, and the front wall section 24 which interconnects respective front ends of the pair of side wall sections 25 in the vehicle width direction, the open section portion 23 is configured to be continuous in the vehicle vertical direction, including the breaking promotion portion 30 of the reinforcing member 20, and the side-wall lower portion 25d, including the lower end portion of the side wall section 25, is configured such that the length, in the vehicle longitudinal direction, thereof is relatively long, compared to another part, in the vehicle vertical direction, of the side wall section 25 (the side-wall upper portion 25u in the present embodiment) (see FIG. 5 particularly).

According to this structure, since the side-wall lower portion 25d, including the lower end portion of the side wall section 25, is configured such that the length, in the vehicle longitudinal direction, thereof is relatively long, compared to the side-wall upper portion 25u, the lower portion of the reinforcing member 20 can be reinforced. Thereby, the lower portion of the reinforcement 20 is suppressed from being broken improperly against the collision load inputted to the windshield 1 from the upward side in the vehicle frontal collision, so that the reinforcing member 20 can be broken and deformed securely at the breaking promotion portion 30 located at the upper level than the side-wall lower portion 25d. Accordingly, the breaking deformation of the reinforcing member 20 in the vehicle frontal collision can be attained properly.

Further, since the breaking promotion portion 30 is provided at the reinforcing member 20 at the position located above the reinforced side-wall lower portion 25d, this breaking promotion portion 30 can be positioned more closely to a load-input point of the collision load inputted to the reinforcing member 20 from the upward side in the vehicle frontal collision than the side-wall lower portion 25d.

Thus, by positioning the breaking promotion portion 30 properly closely to the load-input point of the reinforcing member 20, the reinforcing member 20 can be broken and deformed securely at the breaking promotion portion 30 as the breaking point when the large load is inputted from the upward side of the windshield 1.

That is, since the present embodiment is configured such that the length, in the vehicle longitudinal direction, of the side-wall lower portion 25d is longer than that of the side-wall upper portion 25u and also the breaking promotion portion 30 is provided at the reinforcing member 20 at the position located above the reinforced side-wall lower portion 25d, the breaking deformation of the reinforcing member 20 in the vehicle frontal collision can be attained properly.

In the present embodiment, as shown in FIGS. 2-4 and 7A, the penetrating hole 31a is provided at the front wall section 24 of the breaking operation portion 30.

According to this structure, since the breaking promotion portion 30 can be made properly fragile by means of the penetrating hole 31a, the secure breaking of the reinforcing member 20 in the vehicle frontal collision can be attained at the breaking promotion portion 30.

In the present embodiment, as shown in FIGS. 2-5 and 6A, the reinforcing member 20 comprises the rearward projection portion 28 which is provided to project rearwardly beyond the front-wall straight portion 124 at the position below the front-wall straight portion 124 (straight portion).

According to this structure, the rearward projection portion 28 as well as the breaking promotion portion 30 can cause the breaking of the reinforcing member 20 in the vehicle frontal collision. Further, in the breaking and deformation of the reinforcing member 20 in the vehicle frontal collision, the reinforcing member 20 can be broken and deformed such that its upper part above the rearward projection portion 28 falls down forwardly.

Consequently, the broken-and-deformed reinforcing member 2 can attain the efficient energy absorption of the cowl panel 10 in the vehicle frontal collision, without hindering the crushing deformation of the cowl panel 10 having a S-shaped cross section (the forward protrusion portion 12 and the rearward protrusion portion 13).

In the present embodiment, as shown in FIGS. 2, 3 and 7B, the flat-face portion 15 which is flat-face shaped is formed at the front end part of the forward protrusion portion 12, and the upper joint-flange portion 29 as the joint part (see FIGS. 2-5 and 7B) is joined to the flat-face portion 15.

Herein, in a case where the upper joint-flange portion 29 is joined to a lower face of the forward protrusion portion 12, for example, it is required that the upper joint-flange portion 29 is configured to be oblique in the vehicle longitudinal direction relative to the vehicle vertical direction so that the upper joint-flange portion 29 can be joined to the lower face of the forward protrusion portion 12 from the downward side. Therefore, it becomes difficult that the upper part of the reinforcing member 20, including the upper joint-flange portion 29, is configured to be straight along the vehicle vertical direction.

According to the present embodiment, however, since the flat-face portion 15 is formed at the front end part of the forward protrusion portion 12, the upper joint-flange portion 29 configured to be straight along the vehicle vertical direction in the vehicle side view can be joined to the flat-face portion 15 from the rearward side of the vehicle.

Thereby, it is unnecessary that the upper part of the reinforcing member 20, including the upper joint-flange portion 29, is configured to be oblique in the vehicle longitudinal direction relative to the vehicle vertical direction, considering its joint to the forward protrusion portion 12, and therefore, it can be configured to be straight along the vehicle vertical direction.

Accordingly, the load F (see FIG. 3) of the vehicle longitudinal direction which acts on the front end portion (15) of the forward protrusion portion 12, which may be caused by the vibrations of the powertrain or the like at the vehicle normal traveling, can be received by the axial force of the reinforcing member 20 extending in the vehicle vertical direction, including the upper joint-flange portion 29, so that the opening deformation of the rearward protrusion portion 13 can be suppressed effectively, in particular.

The present invention should not be limited to the above-described embodiment but can be embodied in various manners. For example, while the reinforcing member 20 of the present embodiment is configured, as shown in FIG. 5, such that the side-wall upper portion 25u is of the straight shape extending in the vehicle vertical direction and the side-wall lower portion 25d is curved, protruding obliquely downwardly-and-rearwardly, in the vehicle side view, the reinforcing member of the present invention may be configured such that the side wall section is of the straight shape over an entire range of the vehicle vertical direction in the vehicle side view (that is, the length, in the vehicle longitudinal direction, of the reinforcing member is substantially constant in the vehicle vertical direction), which is not illustrated.

Further, while the reinforcing member 20 of the present embodiment is configured such that the lower joint-flange portion 26 is joined to the lower face portion 14 of the cowl panel 10 and joined indirectly to the dash panel 3 via the lower face portion 14 (see FIGS. 2 and 3), the lower portion of the reinforcing member may be directly joined to the dash panel 3 without any portion of the cowl panel, such as the lower face portion (which is not illustrated).

Moreover, the breaking promotion portion 30 may be configured such that its cross section perpendicular to the vehicle vertical direction is formed as the open section portion 23 like the present embodiment (see FIG. 7A) as long as the sectional area, in the direction perpendicular to the vehicle vertical direction, of the open section portion 23 is smaller than that of the other portion, in the vehicle vertical direction, of the reinforcing member 20. Herein, the reinforcing member of the present invention is not limited to the above-described embodiment, but the breaking promotion portion 30 may be formed in the nearly straight shape only by the front wall portion 24 extending in the vehicle width direction, for example.

Finally, while the pair of reinforcing members 20 of the above-described embodiment are provided to be spaced apart from each other in the vehicle width direction at the central portion, in the vehicle width direction, of the cowl panel 10 (see FIGS. 1 and 2), a single reinforcing member may be provided at the center, in the vehicle width direction, of the cowl panel or plural reinforcing members may be arranged in the vehicle width direction.

What is claimed is:

1. A vehicle-body structure of a vehicle, comprising:
   a windshield;
   a cowl panel supporting the windshield from a downward side; and
   a dash panel supporting the cowl panel from the downward side,
   wherein said cowl panel comprises an upper face portion where said windshield is joined, a forward protrusion portion which extends downwardly from the upper face portion, protruding forwardly, a rearward protrusion portion which extends downwardly from a lower end of the forward protrusion portion, protruding rearwardly, and a lower face portion which extends forwardly from a lower end of the rearward protrusion portion, and
   a reinforcing member which is positioned on a forward side of said cowl panel and joined to said forward protrusion portion and said lower face portion is provided, said reinforcing member comprises a straight portion which substantially straightly extends downwardly from a joint part where the reinforcing member is joined to said forward protrusion portion, and said straight portion is provided with a fragile part which is configured to be relatively fragile, compared to a peripheral portion, in a vertical direction, of the reinforcing member,
   wherein said reinforcing member comprises an open section portion in which a cross section, in a direction perpendicular to a vehicle vertical direction, thereof has a corner portion and is opened forwardly or rearwardly, said fragile part is configured such that a sectional area, in the direction perpendicular to the vehicle vertical direction, of said open section portion is smaller than that of another portion, in the vehicle vertical direction, of said reinforcing member.

2. The vehicle-body structure of the vehicle of claim 1, wherein said open section portion of the reinforcing member comprises a pair of side wall sections which respectively extend in a vehicle longitudinal direction, being spaced apart from each other in a vehicle width direction, and a front wall section which interconnects respective front ends of the pair of side wall sections in the vehicle width direction, said open section portion is configured to be continuous in the vehicle vertical direction, including said fragile part of the reinforcing member, and a lower end part of said side wall section is configured such that a length, in the vehicle longitudinal direction, thereof is relatively long, compared to another part, in the vehicle vertical direction, of said side wall section including said fragile part.

3. The vehicle-body structure of the vehicle of claim 2, wherein a penetrating hole is provided at said fragile part.

4. The vehicle-body structure of the vehicle of claim 3, wherein said reinforcing member comprises a rearward projection portion which is provided to project rearwardly beyond said straight portion at a position below the straight portion.

5. The vehicle-body structure of the vehicle of claim 4, wherein a flat-face portion which is flat-face shaped is formed at a front end part of said forward protrusion portion, and said joint part is joined to said flat-face portion.

6. The vehicle-body structure of the vehicle of claim 3, wherein a flat-face portion which is flat-face shaped is formed at a front end part of said forward protrusion portion, and said joint part is joined to said flat-face portion.

7. The vehicle-body structure of the vehicle of claim 2, wherein said reinforcing member comprises a rearward projection portion which is provided to project rearwardly beyond said straight portion at a position below the straight portion.

8. The vehicle-body structure of the vehicle of claim 7, wherein a flat-face portion which is flat-face shaped is formed at a front end part of said forward protrusion portion, and said joint part is joined to said flat-face portion.

9. The vehicle-body structure of the vehicle of claim 2, wherein a flat-face portion which is flat-face shaped is formed at a front end part of said forward protrusion portion, and said joint part is joined to said flat-face portion.

10. The vehicle-body structure of the vehicle of claim 1, wherein said reinforcing member comprises a rearward projection portion which is provided to project rearwardly beyond said straight portion at a position below the straight portion.

11. The vehicle-body structure of the vehicle of claim 10, wherein a flat-face portion which is flat-face shaped is formed at a front end part of said forward protrusion portion, and said joint part is joined to said flat-face portion.

12. The vehicle-body structure of the vehicle of claim 1, wherein a flat-face portion which is flat-face shaped is formed at a front end part of said forward protrusion portion, and said joint part is joined to said flat-face portion.

13. A vehicle-body structure of a vehicle, comprising:
a windshield;
a cowl panel supporting the windshield from a downward side; and
a dash panel supporting the cowl panel from the downward side,
wherein said cowl panel comprises an upper face portion where said windshield is joined, a forward protrusion portion which extends downwardly from the upper face portion, protruding forwardly, a rearward protrusion portion which extends downwardly from a lower end of the forward protrusion portion, protruding rearwardly, and a lower face portion which extends forwardly from a lower end of the rearward protrusion portion, and
a reinforcing member which is positioned on a forward side of said cowl panel and joined to said forward protrusion portion and said lower face portion is provided, said reinforcing member comprises a straight portion which substantially straightly extends downwardly from a joint part where the reinforcing member is joined to said forward protrusion portion, and said straight portion is provided with a fragile part which is configured to be relatively fragile, compared to a peripheral portion, in a vertical direction, of the reinforcing member,
wherein a penetrating hole is provided at said fragile part.

14. The vehicle-body structure of the vehicle of claim 13, wherein said reinforcing member comprises a rearward projection portion which is provided to project rearwardly beyond said straight portion at a position below the straight portion.

15. The vehicle-body structure of the vehicle of claim 13, wherein a flat-face portion which is flat-face shaped is formed at a front end part of said forward protrusion portion, and said joint part is joined to said flat-face portion.

* * * * *